Jan. 23, 1945. F. S. KING 2,367,824
GRAVEL GUARD CONSTRUCTION
Filed Oct. 10, 1941
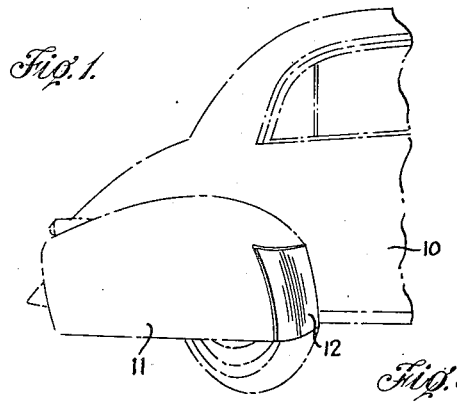
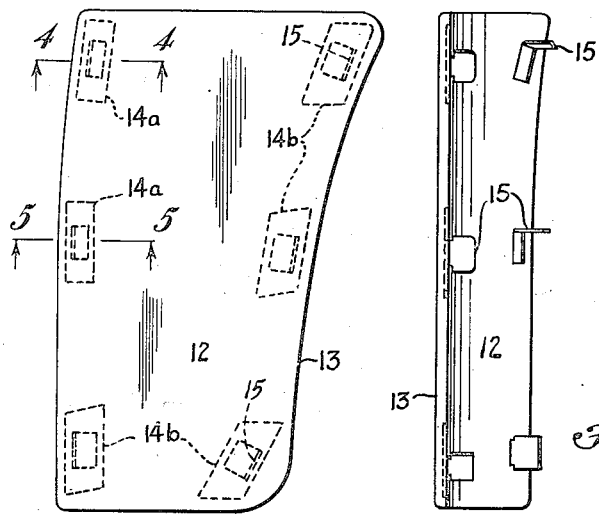
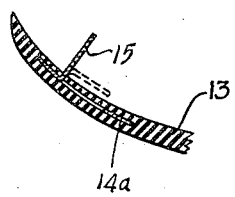
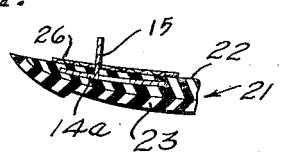
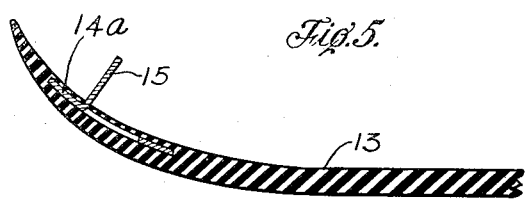
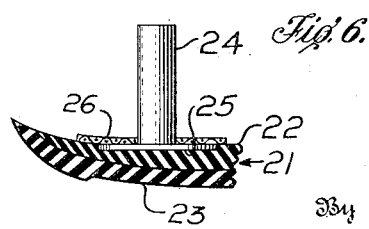
Inventor
Frank S. King
By Ely & Frye
Attorneys Patented Jan. 23, 1945

2,367,824

UNITED STATES PATENT OFFICE 2,367,824

GRAVEL GUARD CONSTRUCTION

Frank S. King, Akron, Ohio, assignor to The Firestone Tire & Rubber Company, Akron, Ohio, a corporation of Ohio Application October 10, 1941, Serial No. 414,471

2 Claims. (Cl. 280—153)

This invention relates to means for protecting automobile fenders from gravel, stones or other small articles thrown against the rear portion of the car by the front wheels of the car, and has particular reference to guards for the front sections of the rear fenders of automobiles which have no running boards.

The present day streamline design of automobiles has either completely eliminated running boards, or else has resulted in narrow, enclosed running boards being used. This results in a construction wherein the fenders of the automobile project laterally from the body so that the automobile running board no longer is present to protect a rear fender and the automobile body from articles thrown upwardly and rearwardly from the front wheels of the car, when the car is in motion. This change in automobile design has resulted in the use of gravel guards on the lower front regions of the rear fenders, which guards generally comprise rubber covered metal sheets which could be secured to the fender in order to protect same against abrasion, and to provide a surface which would not be injured by being struck repeatedly by small stones or the like.

However, it has been observed that the metal backing sheets of the gravel guards, are not entirely necessary and that they add to the weight and expense of the gravel guard. Furthermore, it is becoming increasingly difficult to obtain metallic material for general use.

The general object of the present invention is to overcome the foregoing and other disadvantages of the present type gravel guards while also providing a novel, inexpensive, light weight, sturdy gravel guard construction.

The foregoing and other objects of the invention will be manifest as the specification proceeds.

The invention is described with particular reference to the accompanying drawing, in which:

Figure 1 is a fragmentary, prospective view of an automobile, showing one embodiment of the invention associated therewith;

Figure 2 is a plan of the gravel guard embodying the invention;

Figure 3 is a right side elevation of the gravel guard of Figure 2;

Figures 4 and 5 are enlarged cross sections taken on lines 4—4 and 5—5 of Figure 2, respectively;

Figure 6 is a section, similar to Figure 4 of a modified gravel guard construction of the invention, and Figure 7 is the same as Figure 6 except the insert shown in Figure 5 is substituted for the rivet 24 of Figure 6.

Referring in detail to the accompanying drawing, a modern style automobile, 10, having a rear fender 11, is shown. A gravel guard 12, embodying the invention, is secured to the front lower portion of the fender 11, as shown.

The gravel guard 12, mainly comprises a rubber sheet 13, which is contoured to fit snugly against the lower front portion of the fender 11. Preferably the rubber 13, is relatively hard and is vulcanized to a given shape which it will retain. A plurality of metallic inserts 14a, and 14b, are imbedded in the rubber sheet 13, in order to secure same to a fender. The inserts 14a are of rectangular shape, while the inserts 14b are formed to parallelogram shape. All of the inserts are formed from thin metal sheets and fit smoothly into the contour of the rubber plate 13, without increasing the thickness thereof. The inserts 14a and 14b have tongues or lugs 15 struck out therefrom, which tongues extend rearwardly from the gravel guard 12, and are adapted to extend through slots formed in the fender 11, and thereafter be bent over to secure the gravel guard to the fender.

It will be seen that the total amount of metal used to form the inserts 14a and 14b is relatively small in comparison with the amount of metal required to form a continuous metal reinforcing sheet for the gravel guard 12, which continuous sheet has been used in previous gravel guard constructions.

Figure 6 of the drawing shows a modified gravel guard construction 21, which mainly comprises a hard rubber backing layer 22 and a soft rubber facing layer 23 vulcanized or otherwise suitably secured thereto. The amount of metal present in the gravel guard 21 is reduced over even the small amount of metal present in the gravel guard 12, by using inserts in the form of rivets 24, to secure the gravel guard to an automobile. The rivets 24 have enlarged flat heads 25, which are shown imbedded in the surface of the relatively hard rubber backing layer 22, although the heads 25 may be totally imbedded in the rubber, if desired. The rivets 24 are spaced through the gravel guard 21, similarly to the inserts 14a and 14b in the gravel guard 12. Fabric patches or discs 26 are imbedded in the hard rubber reinforcing layer 22, directly under the rivet heads 25, in order to imbed the rivets firmly in the hard rubber layer 22. The use of a soft rubber facing on the gravel guard 21 is highly desirable in that the soft facing is not damaged at all by repeated contact with small, sharp articles, such as flying stones, gravel and the like. Of course, such soft rubber facing layer, or fabric patches 26 can be used in connection with the rubber sheet 13 of the gravel guard 12, when desired, or the entire rubber sheet 13 may be made from soft rubber which may have fabric reenforcing patches therein similar to the patches 26. The main portion of the rivets 24 extend rearwardly from the gravel guard 21, in order to engage same with the fender, with which the gravel guard is mounted.

In both embodiments of the invention, the inserts are vulcanized to the rubber layer and the gravel guard is molded and vulcanized as a unit.

While several embodiments of the invention have been completely illustrated and described herein, it will be appreciated that modification thereof may be made without departing from the scope of the invention, as defined in the appended claims.

I claim:

1. A molded fender guard comprising a base layer of hard rubber, a facing layer of soft rubber, said layers being united in a permanent bond by vulcanization, said layers forming a unit with its attaching side molded to a complementary shape of the portion of a fender on which it is to be placed, a plurality of spaced metallic inserts imbedded in said unit, said inserts being of thin metal fitting smoothly into the body portion of said unit, and having spaced lugs extending inwardly from said guard to secure it to a fender, said lugs being adapted to project through slots formed in said fender and to be bent over whereby said guard may be attached to said fender, said guard having reinforcing members around said projected lugs in the form of fabric patches, said patches being attached to the fender contact side of said guard.

2. A fender guard comprising a hard rubber layer contoured to fit closely to a portion of a fender, a soft rubber facing vulcanized to said hard rubber layer, a plurality of spaced metallic inserts embedded in the unit formed of said rubber layer and facing, said inserts being made from thin metal sheeting and fitting smoothly into the body of said unit, said inserts having lugs extending inwardly from the fender guard for securing same to a fender, and a plurality of pieces of fabric secured to said unit on the inner surface thereof underneath said inserts and having said lugs extending therethrough, said fabric pieces extending laterally beyond said inserts in all directions.

FRANK S. KING.